United States Patent
Hino

(10) Patent No.: US 6,185,563 B1
(45) Date of Patent: Feb. 6, 2001

(54) DOCUMENT MANAGEMENT METHOD AND APPARATUS FOR ENSURING CONSISTENCY OF DOCUMENT CONTENTS

(75) Inventor: Yosuke Hino, Tokyo (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/119,630

(22) Filed: Jul. 21, 1998

(30) Foreign Application Priority Data

Sep. 11, 1997 (JP) .................................. 9-247009

(51) Int. Cl.⁷ .................................................. G06F 17/30
(52) U.S. Cl. .................. 707/8; 707/10; 707/513; 709/203; 709/210; 709/225; 709/229
(58) Field of Search .................. 707/8, 10, 104, 707/3, 513; 709/203, 210, 219, 225, 229

(56) References Cited

U.S. PATENT DOCUMENTS

| | | | | |
|---|---|---|---|---|
| 4,141,078 | * | 2/1979 | Bridges, Jr. et al. | 705/920 X |
| 4,153,931 | * | 5/1979 | Green et al. | 707/104 |
| 5,008,853 | * | 4/1991 | Bly et al. | 707/511 |
| 5,251,315 | | 10/1993 | Wang | 395/600 |
| 5,288,980 | * | 2/1994 | Patel et al. | 235/381 |
| 5,333,312 | | 7/1994 | Wang | 395/600 |
| 5,623,659 | | 4/1997 | Shi et al. | 395/608 |
| 5,715,403 | * | 2/1998 | Stefik | 705/44 |
| 5,734,823 | * | 3/1998 | Saigh et al. | 709/229 |
| 5,774,670 | * | 6/1998 | Montulli | 709/227 |
| 5,884,298 | * | 3/1999 | Smith, II et al. | 707/2 |
| 5,966,707 | * | 10/1999 | Van Huben et al. | 707/10 |
| 6,052,514 | * | 4/2000 | Gill et al. | 395/331 |
| 6,061,697 | * | 5/2000 | Nakao | 707/513 |

FOREIGN PATENT DOCUMENTS 6-243014   9/1994   (JP) .
6-314227   11/1994  (JP) .
9-185540   7/1997   (JP) .

* cited by examiner

Primary Examiner—Jean R. Homere
(74) Attorney, Agent, or Firm—Finnegan, Henderson, Farabow, Garrett & Dunner, L.L.P.

(57) ABSTRACT

In an client-server electronic filing system, the server performs check-in check-out management on documents that two or more clients share and restrains the check-out of the same document by two or more clients. Through the use of a check-in check-out table for check-in check-out management of documents that the clients share, the server prohibits the check-out of a document requested by a client until the document is checked in or until the check-out of the document is canceled, thereby preventing concurrent multiple updating of the same document by two or more clients.

2 Claims, 11 Drawing Sheets

| STATUS | CHECK-OUT USER | | | USER WITH CHECK-OUT CANCEL RIGHT | | | OTHER USERS | | |
|---|---|---|---|---|---|---|---|---|---|
| | UPDATE | CHECK-IN | CHECK-OUT CANCEL | UPDATE | CHECK-IN | CHECK-OUT CANCEL | UPDATE | CHECK-IN | CHECK-OUT CANCEL |
| CHECK-OUT | NON-ALLOWABLE | ○ | ○ | NON-ALLOWABLE | ○ | ○ | NON-ALLOWABLE | × | ERROR PROCEDURE |
| TIME LIMIT EXPIRED DURING CHECK-OUT | ○ | | ○ | ○ | | ○ | ○ | | ○ |
| CHECK-IN | ○ | | ○ | NON-ALLOWABLE | | ○ | NON-ALLOWABLE | | ERROR PROCEDURE |
| TIME LIMIT EXPIRED DURING CHECK-IN | ○ | | ○ | NON-ALLOWABLE | | ○ | NON-ALLOWABLE | | ERROR PROCEDURE |

TBL-A 21

| FIELD NAME | CONTENTS | NOTE |
|---|---|---|
| DOCUMENT_NO. | DOCUMENT MANAGEMENT NUMBER IN INVENTIVE SYSTEM, IDENTIFIER THAT UNIQUELY IDENTIFIES DOCUMENT | INTEGER OF ONE OR MORE |
| CHKOUT_USER | CHECK-OUT USER | ———— |
| CHKOUT_DATE | CHECK-OUT DATE | ———— |
| CHKOUT_LIMIT | CHECK-OUT TIME LIMIT | ———— |
| CHKIN_STATUS | CHECK-IN STATUS | 0:CHECK-OUT STATUS<br>1:ADDITION REQUEST STATUS<br>2:DOCUMENT REPLALEMENT STATUS<br>3:DOCUMENT REVISION STATUS |

FIG. 3

TBL-B 22

| FIELD NAME | CONTENTS | NOTE |
|---|---|---|
| DOCUMENT_NO. | DOCUMENT MANAGEMENT NUMBER | UNIQUE IN THIS TABLE |
| NEW_DOCUMENT_NO. | NEW DOCUMENT MANAGEMENT NUMBER | 0:WITHOUT OLD VERSION<br>1 OR MORE:DOCUMENT MANAGEMENT NUMBER OF OLD VERSION (ONE VERSION BEFORE) |
| OLD_DOCUMENT_NO. | OLD DOCUMENT MANAGEMENT NUMBER | 0:WITHOUT NEW VERSION<br>1 OR MORE:DOCUMENT MANAGEMENT NUMBER OF NEW VERSION (ONE VERSION LATER) |

FIG. 4

TBL-C 23

| FIELD NAME | CONTENTS | NOTE |
|---|---|---|
| USER | USER ID | USER IDENTIFIER |
| PERMISSION | RIGHT | 0:WITHOUT CHECK-OUT CANCEL RIGHT<br>1:WITH CHECK-OUT CANCEL RIGHT |

FIG. 5

| STATUS | CHECK-OUT USER | | | USER WITH CHECK-OUT CANCEL RIGHT | | | OTHER USERS | | |
|---|---|---|---|---|---|---|---|---|---|
| | UPDATE | CHECK-IN | CHECK-OUT CANCEL | UPDATE | CHECK-IN | CHECK-OUT CANCEL | UPDATE | CHECK-IN | CHECK-OUT CANCEL |
| CHECK-OUT | NON-ALLOWABLE | ○ | ○ | NON-ALLOWABLE | ○ | ○ | NON-ALLOWABLE | × | ○ |
| TIME LIMIT EXPIRED DURING CHECK-OUT | ○ | | ○ | ○ | | ○ | ○ | ERROR PROCEDURE | |
| CHECK-IN | ○ | | ○ | NON-ALLOWABLE | | ○ | NON-ALLOWABLE | ERROR PROCEDURE | |
| TIME LIMIT EXPIRED DURING CHECK-IN | ○ | | ○ | NON-ALLOWABLE | | ○ | NON-ALLOWABLE | ERROR PROCEDURE | |

FIG. 11

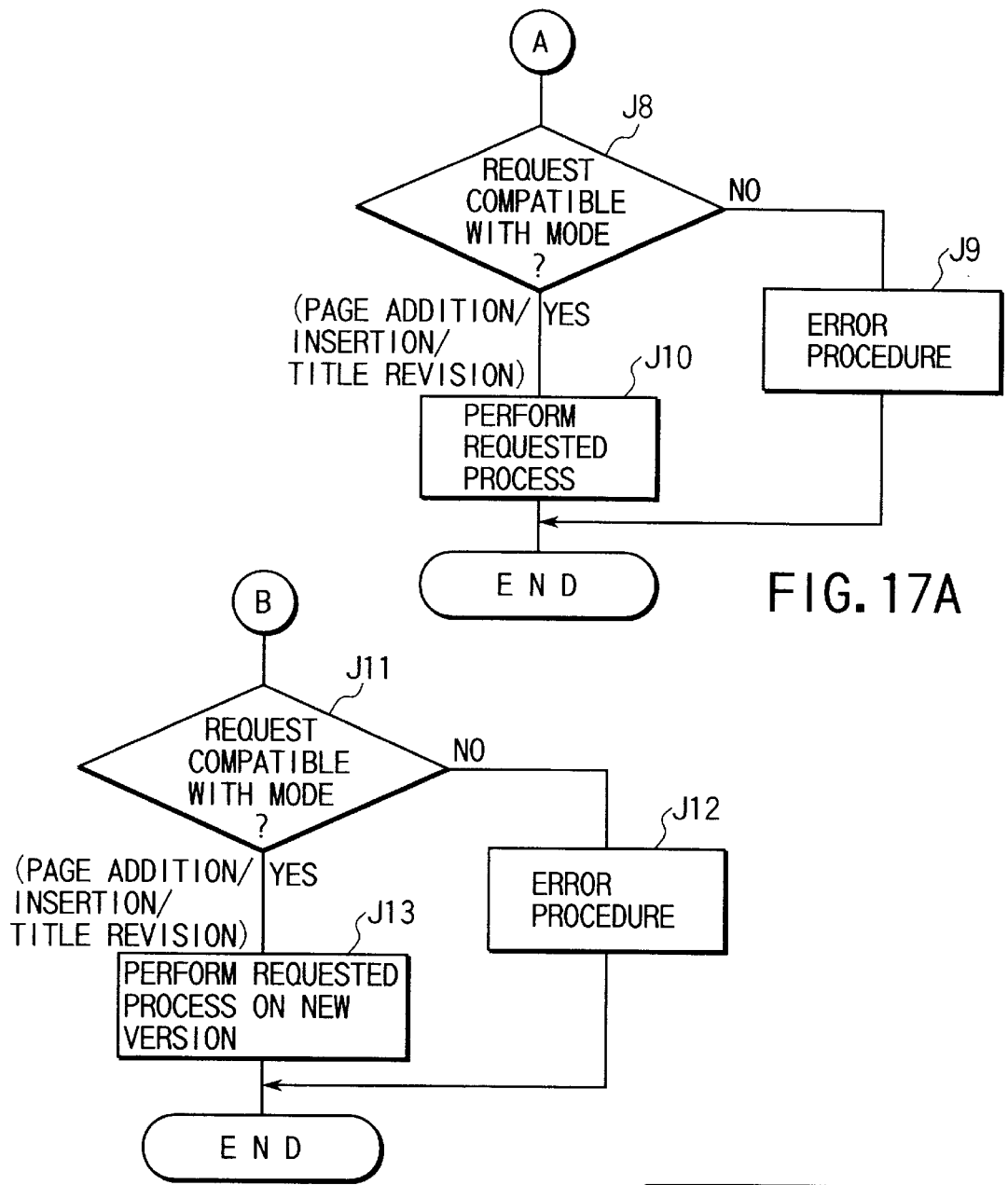
FIG. 17A
FIG. 17B
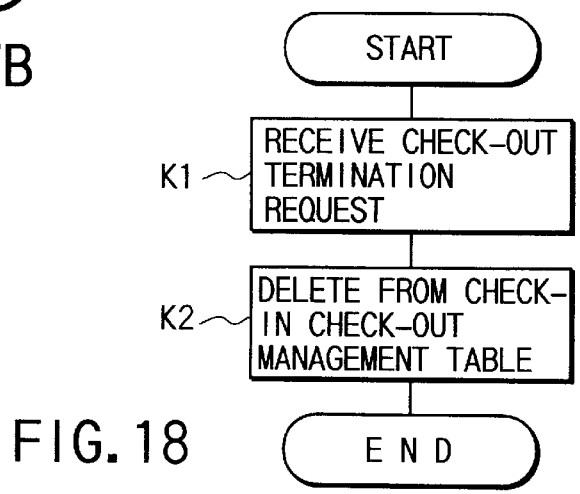
FIG. 18

DOCUMENT MANAGEMENT METHOD AND APPARATUS FOR ENSURING CONSISTENCY OF DOCUMENT CONTENTS

BACKGROUND OF THE INVENTION

The present invention relates to a client-server electronic filing system, a document filing method and storage medium for use in the filing system, and more particularly to a client-server electronic filing system having a check-in check-out facility for document management, a document management method and storage medium for use in the filing system.

The client-server electronic filing system allows two or more clients to share documents and has a feature that, when a change is made to a document by a client, the resulting document can be immediately referenced by the other clients. For this reason, this type of filing system has an exclusive control function among two or more clients to ensure the consistency of information two or more clients share. In addition, the system has such a security function as to specify clients who are allowed to make references and changes to documents or document folders.

With this type of filing system, however, the following problem arises when two or more clients update the same document. That is, a client A retrieves a document for updating purpose and updates it on the client side. Before the result of the updating is reflected in the server, another client B may also reference the same document for updating purpose. At this point, the updating by the client A is not yet reflected in the document that the client B is referencing. After that, the result of updating by the client A will be reflected in the original document in the server. At a still later time, the result of updating by the client B will be reflected in the document in the server.

As a result, in the server the document updated by the client A will be overwritten by the document updated by the client B, so that the updating by the client A is not reflected in the document in the server, but only the updating by the client B is reflected.

Thus, the problem with the conventional system is that changes made by clients are not reflected correctly.

Conventionally there is also a method to allow only one client to update a document through the control of update rights. This method imposes operation restrictions which are too stringent to solve the above-described problem and is not suitable for the essential technical concept of document sharing by two or more clients.

BRIEF SUMMARY OF THE INVENTION

Accordingly, it is an object of the present invention to provide a client-server electronic filing system which ensures consistency of document contents and permits an update by each client to be reflected correctly in the original document, and a document management method and a storage medium for use in the electronic filing system.

It is another object of the present invention to provide a client-server electronic filing system which permits the concurrent double updating of a document by two or more clients to be prevented, and a document management method and a storage medium for use in the electronic filing system.

According to one aspect of the present invention, there is provided an electronic filing system comprising: a plurality of client units each capable of making a check-in/check-out request for a document; and a server unit having means for directing check-in check-out management of documents that the plurality of client units share, the check-in check-out management means restraining the check-out of the same document by the plurality of client units.

In the system, the check-in check-out management means may include means for prohibiting the check-out of a document until the document is checked in or its check-out is canceled.

In the system, the check-in check-out management means may include means for performing the check-out of the document after the document has been checked in or after its check-out has been canceled.

In the system, the check-in check-out management means may include means for, at the time of check-in, performing requested update processes in sequence.

In the system, the check-in check-out management means may include means for, at the time of check-in, deleting the original document in its entirety, creating a new document, and performing requested update processes on the new document in sequence.

In the system, the check-in check-out management means may include means for, at the time of check-in, automatically creating a new document with the original document left as the old version and performing requested update processes on the new document in sequence.

In the system, the check-in check-out management means may include means for, after the document has been checked out, canceling the check-out of the document without performing any update process.

In the system, the check-in check-out management means may include means for, at the time of check-out of a document, setting a time limit of the check-out, means for monitoring the check-out time limit, and means responsive to the monitoring means for automatically canceling the check-out when the time limit for the document has expired.

In the system, the check-in check-out management means may include means for enabling a specific client to cancel the check-out.

In the system, the check-in check-out management means may include means for, when the document is being checked out, notifying the clients that the document is being checked out.

In the system, the check-in check-out management means may include a check-in check-out table used for the document check-in check-out management, status recording entries being created in the table on a document by document basis with each occurrence of document check-out.

In the system, the status recording entries in the table may include a document management number entry, a check-out client name entry, a check-out date entry, a check-out time limit entry, and a check-in status entry.

In the system, the check-in status entry may be recorded with one of current document statuses of check-out, addition request, replacement, and revision.

According to another aspect of the present invention there is provided a document management method for use in an electronic filing system having a plurality of client units and a server unit, comprising the steps of: installing a facility for performing check-in check-out management of documents that the plurality of client units share; and restraining check-out of the same document by the plurality of client units using the check-in check-out management facility.

In the method, the step of restraining check-out of the same document may include the step of prohibiting check-out of a document until the document is checked in or until the check-out is canceled using the check-in check-out management facility.

In the method, the step of restraining check-out of the same document may include the step of performing the check-out of the document after the document has been checked in or after the check-out has been canceled.

The method may further comprise the step of, at the time of check-in, performing requested update processes in sequence.

The method may further comprise the step of, at the time of check-in, deleting the original document in its entirety, creating a new document, and performing requested update processes on the new document in sequence.

The method may further comprise the step of, at the time of check-in, automatically creating a new document with the original document left as the old version and performing requested update processes on the new document in sequence.

The method may further comprises the step of, after the document has been checked out, canceling the check-out of the document without performing any update process.

The method may further comprise the steps of, at the time of check-out of a document, setting a time limit of the check-out, monitoring the check-out time limit, and automatically canceling the check-out when the time limit for the document has expired.

The method may further comprise the step of enabling a specific client unit to cancel the check-out.

The method may further comprise the step of, when the document is being checked out, notifying the clients that the document is being checked out.

The method may further comprise the steps of providing the check-in check-out management facility with a check-in check-out table used for the document check-in check-out management, and creating status recording entries in the table on a document by document basis with each occurrence of document check-out.

In the method, the status recording entries in the table may include a document management number entry, a check-out client name entry, a check-out date entry, a check-out time limit entry, and a check-in status entry.

In the method, the check-in status entry may be recorded with one of current document statuses of check-out, addition request, replacement, and revision.

According to still another aspect of the present invention, there is provided a storage medium having program code instructions stored thereon which perform document management in an electronic filing system having a plurality of client units and a server unit when executed by a computer, the instructions comprising: means for installing a facility for performing check-in check-out management of documents that the plurality of client units share; and means for restraining check-out of the same document by the plurality of client units using the check-in check-out management facility.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 3 shows the contents of the check-in check-out table (TBL-A) in the document management database of FIG. 1;

FIG. 4 shows the contents of the document link table (TBL-B) in the document management database of FIG. 1;

FIG. 5 shows the contents of the user table (TBL-C) in the document management database of FIG. 1;

FIG. 11 illustrates restrictions on operations from a client that is checking in or checking out in the form of comparison among a check-out user, a user having check-out cancel permission, and other users;

FIGS. 17A and 17B form a flowchart for part of the update request acceptance procedure in step F4 in FIG. 12; and FIG. 18 is a flowchart for the check-in termination (check-out termination) procedure in step F5 in FIG. 12.

DETAILED DESCRIPTION OF THE INVENTION

A preferred embodiment of the present invention will now be described with reference to the accompanying drawings.

Figures 1, 2:
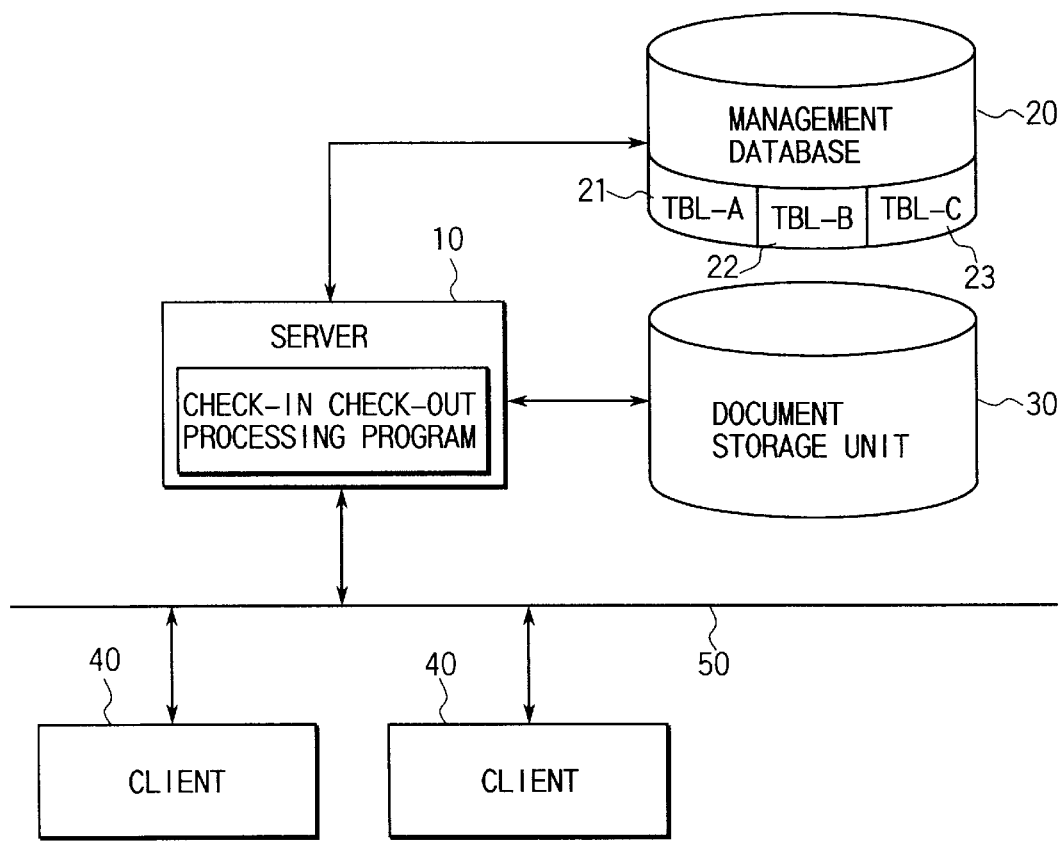
FIG. 1 is a schematic representation of a client-server electronic filing system according to an embodiment of the present invention.
FIG. 2 shows an organization of the check-in check-out table (TBL-A) in the document management database of FIG. 1.

Referring now to FIG. 1 there is illustrated in block diagram a client-server electronic filing system according to an embodiment of the present invention. In the following description, the term "client" may be replaced with "user".

In FIG. 1, reference numerals 10, 20, 21, 22, 23 and 30 denote components on the server side. Specifically, 10 denotes a server body (herein referred to simply as the server) which has a function of storing and managing documents two or more clients share and has its internal storage (not shown) stored with a check-in check-out processing program for implementing a check-in check-out-based document management facility to be described later.

Here, "check-out" refers to that the server lends out a document to a client, and "check-in" refers to that the client returns the document to the server.

Reference numeral 20 denotes a document management database (management DB) that implements the document management facility on a check-in check-out management basis. The document management database has a check-in check-out table (TBL-A) 21 as shown in FIGS. 2 and 3, a document link table (TBL-B) 22 as shown in FIG. 4, and a user table (TBL-C) 23 as shown in FIG. 5. The document management database 20 is a relational database.

Reference numeral 30 denotes a document storage unit that stores documents that two or more clients share and takes in and takes out documents under the document management control of the server 10. In general, this storage unit needs a large storage capacity and hence consists of a large-volume storage unit such as a hard disk drive (HDD), a magneto-optical (MO) disk drive, or the like.

Reference numeral 40 denotes clients that are line connected to the server 10 through a communications path 50 such as a local area network (LAN). Each client has a function of referencing (retrieving, printing, etc.) any document in the database freely and a function of updating the document borrowed through the check-out processing and checking in (i.e., returning) it under the check-in check-out management of the server 10.

Figure 6:
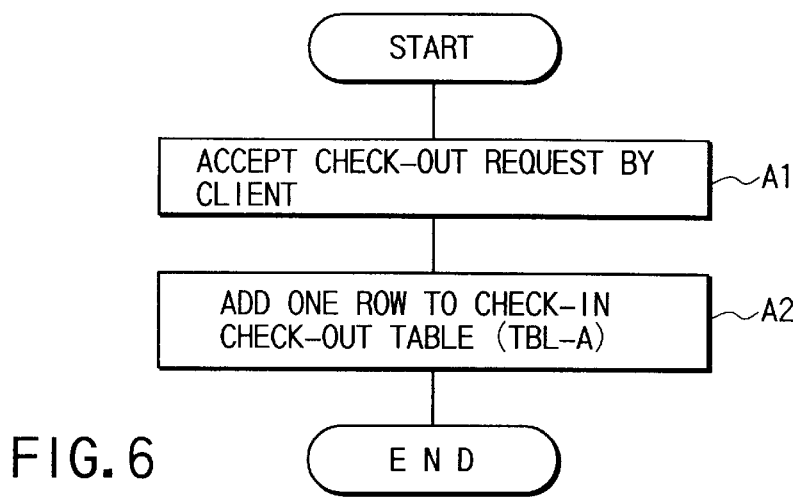
FIG. 6 is a flowchart illustrating a check-out request acceptance procedure of the check-in check-out-based document management facility in the embodiment.

FIGS. 2 and 3 show an example of an organization of the check-in check-out table (TBL-A) 21 in the document management database 20. Here, with each occurrence of a check-out event, one row of status recording entries is created on a document-by-document basis as shown in FIG. 6.

The status recording entries of the check-in check-out table 21 include, as shown in FIG. 3, items of document management number (DOCUMENT No.), check-out user (CHKOUT_USER), check-out date (CHKOUT_DATE), check-out time limit (CHKOUT_LIMIT), and check-in status (CHKIN_STATUS).

The document management number (DOCUMENT_No.) is information that forms an identifier (primary key) for uniquely identifying a document on the system. The check-out user (CHKOUT_USER) is information indicating the user name of a user who has checked out (i.e., borrowed). The check-out date (CHKOUT_DATE) is information concerning the date (year, month, and day) and time when the user checked out, and the check-out time limit (CHKOUT_LIMIT) is information indicating a user-set period during which time the user has the loan of the document.

The check-in status (CHKIN_STATUS) is information representing one of various statuses at the time of check-in. Here, the status is one of check-out status ("0"), addition request status ("1"), document replacement status ("2"), and document revision status ("3").

FIG. 4 shows an organization of the document link table (TBL-B) 22 provided in the document management database 20. The table includes items of document management number (DOCUMENT_NO.), new document management number (NEW_DOCUMENT_NO.), and old document management number (OLD_DOCUMENT_NO.). The revised versions of a document are related to one another by referencing the document link table (TBL-B) 22.

To relate revised versions of a document with one another, information indicating versions of each document is also added. For example, if a certain document is the first one of version 1, then a new document which is a revised version of that document is represented as "2". The old document before revision is represented as "0" because it is not present. Also, if a certain document is the last document of version "3", a new document which is a revised version of that document is represented as "0" because it is not yet present. The old document before revision is represented as "2".

FIG. 5 shows an organization of the user table (TBL-C) 23 provided in the document management database 20. Here, there are provided for each user an item of user ID (USER) that identifies a user and an item of permission (PERMISSION) granted to the user. By making reference to the table, a user who has check-out cancel permission is set or it is determined whether or not a user has check-out cancel permission. As for the permission, for example, "0" indicates that the user has no check-out cancel permission, while "1" indicates that the user has check-out cancel permission.

Hereinafter, the operation of the embodiments of the present invention will be described with reference to the accompanying drawings.

FIGS. 6 to 10 are flowcharts illustrating the procedures of the server 10 according to a check-in check-out processing program for implementing the above-described check-in check-out-based document management facility. More specifically, FIG. 6 is a flowchart illustrating the check-out request acceptance procedure of the server 10, FIG. 7 a flowchart illustrating the check-in request acceptance procedure in the addition request mode, FIG. 8 a flowchart illustrating the check-in request acceptance procedure in the document replacement mode, FIG. 9 a flowchart illustrating the check-in request acceptance procedure in the document revision mode, and FIG. 10 a flowchart illustrating the check-out cancel procedure.

First, reference will be made to the flowchart of FIG. 6 to describe the request acceptance procedure of the server when a client 40 makes a check-out request. The processing described here forms a part of check-out processing (step F2) in FIG. 12 which will be described later in detail.

Upon accepting a check-out request from a client 40 (step A1 in FIG. 6), the server 10 determines whether or not the check-out of a specified document is possible on the basis of a document management number specified in the request. When the determination is that it is possible, the server creates one row of status recording entries including data items of document management number (DOCUMENT_NO.), check-out user (CHKOUT_USER), check-out date (CHKOUT_DATE), check-out time limit (CHKOUT_LIMIT), and check-in status (CHKOUT_STATUS) as shown in FIGS. 2 and 3 in the check-in check-out table (TBL-A) 21 in accordance with the specified document management number and then writes into each entry as specified at the time of the request (step A2). At this point, the check-out time limit can be set freely by the user.

Here, the document management number specified at request time is written into the document management number entry. The log-in user's user identification (ID) is written into the check-out user entry. The system time in the server 10 is written into the check-out date entry. Unless specified by the user, a predetermined date, for example, the date after one month, is written into the check-out time limit entry. A "0" is written into the check-in status entry to indicate that the document is being checked out. In this manner, the specified document is checked out (i.e., the document is lent out to the user).

Figure 8:
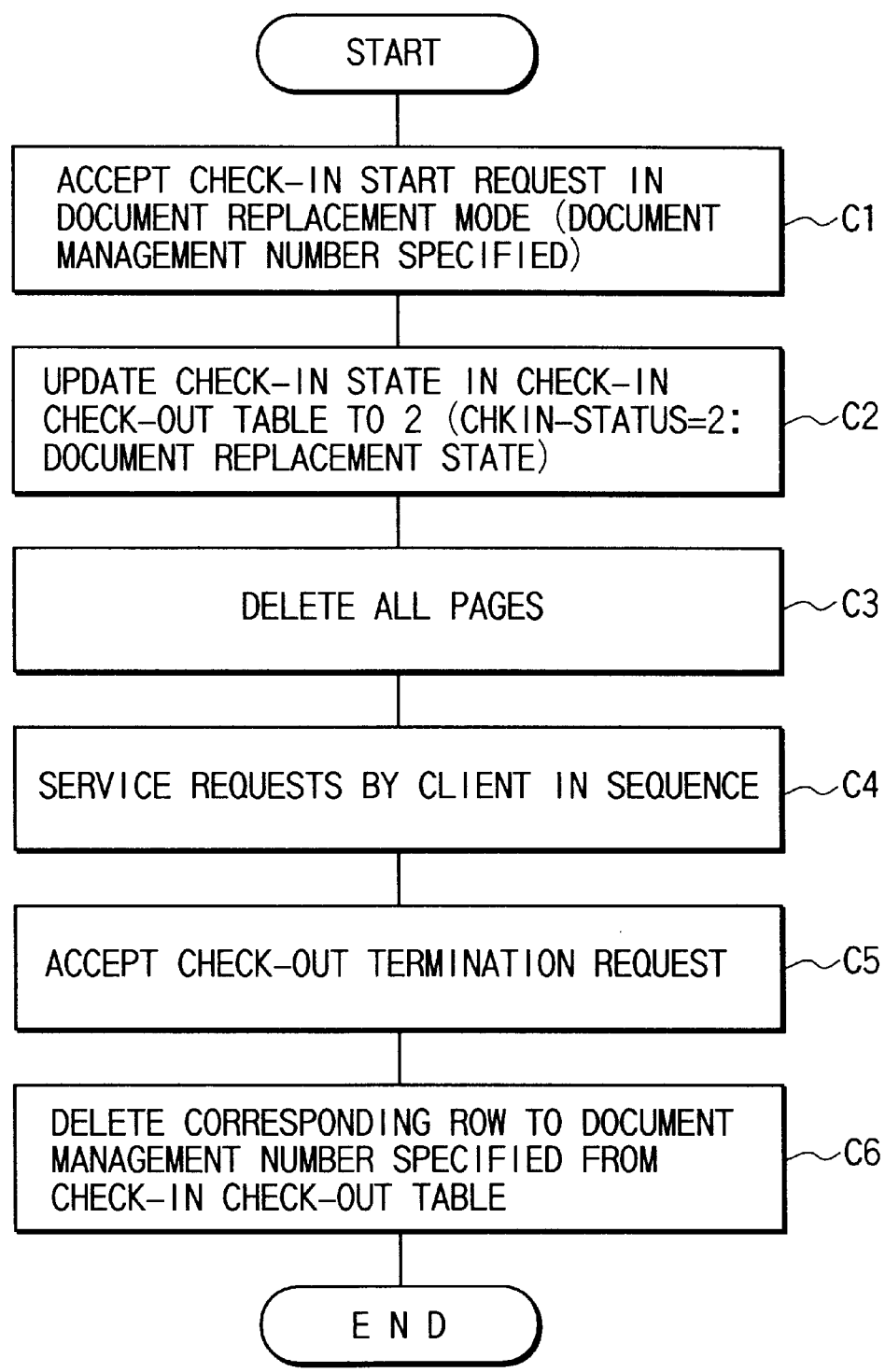
FIG. 8 is a flowchart illustrating a check-in request acceptance procedure in the document replacement mode of the check-in check-out-based document management facility in the embodiment.
Figure 9:
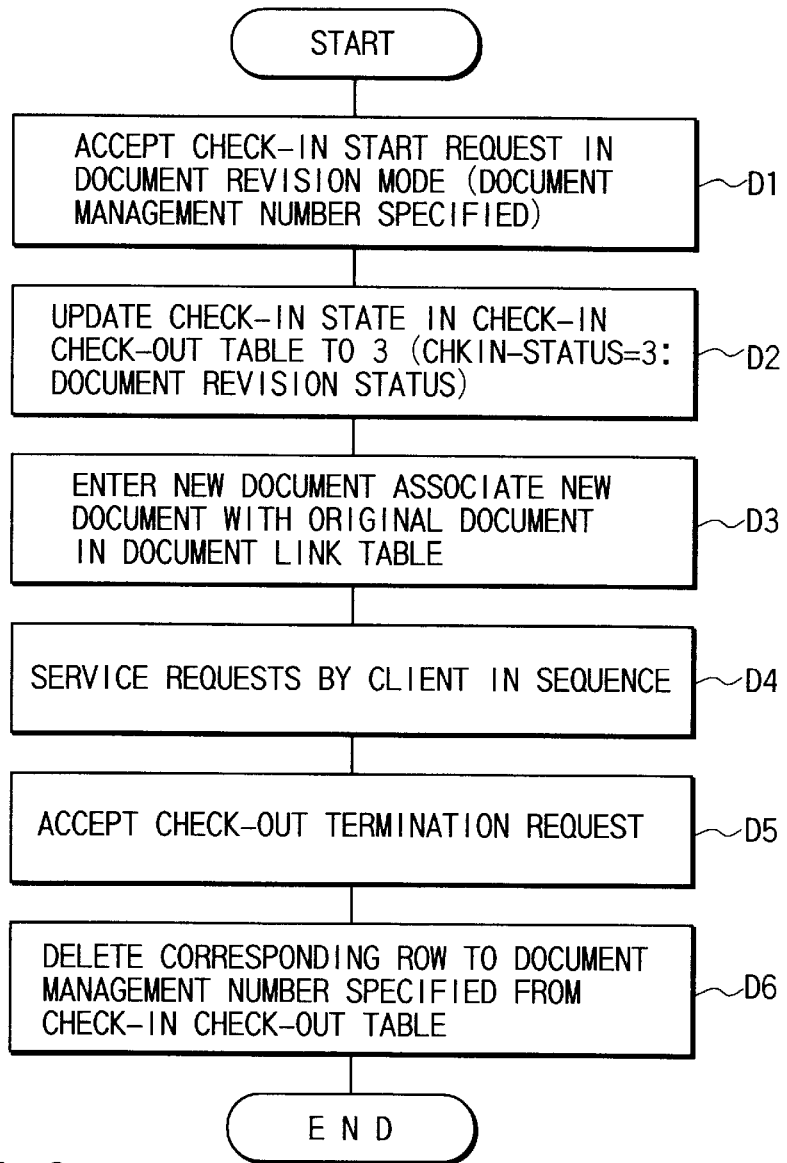
FIG. 9 is a flowchart illustrating a check-in request acceptance procedure in the document revision mode of the check-in check-out-based document management facility in the embodiment.
Figure 10:
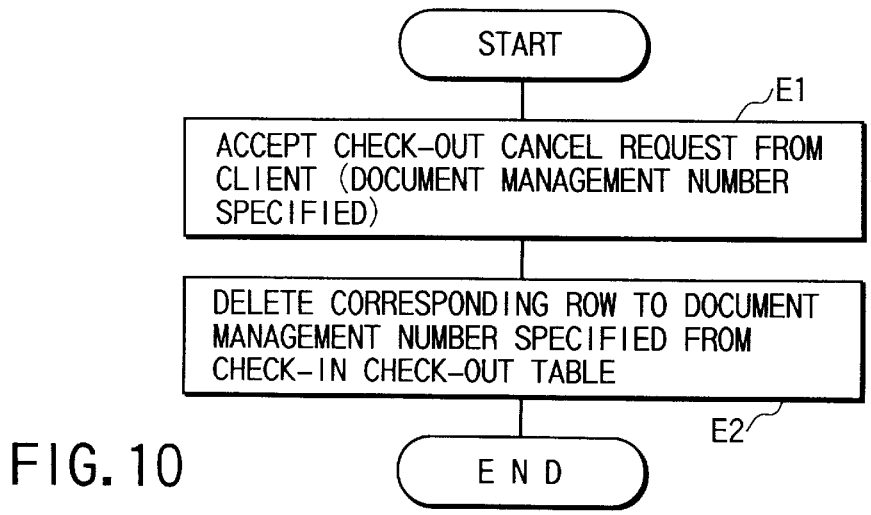
FIG. 10 is a flowchart illustrating a check-out cancel procedure of the check-in check-out-based document management facility in the embodiment.

Next, the request acceptance processing operation of the server when the client 40 makes a check-in request accompanied by updates after the document has been checked out will be described with reference to the flowcharts of FIGS. 8, 9 and 10. This processing forms a part of check-in processing (step F3) in FIG. 12 which will be described later in detail.

Figure 7:
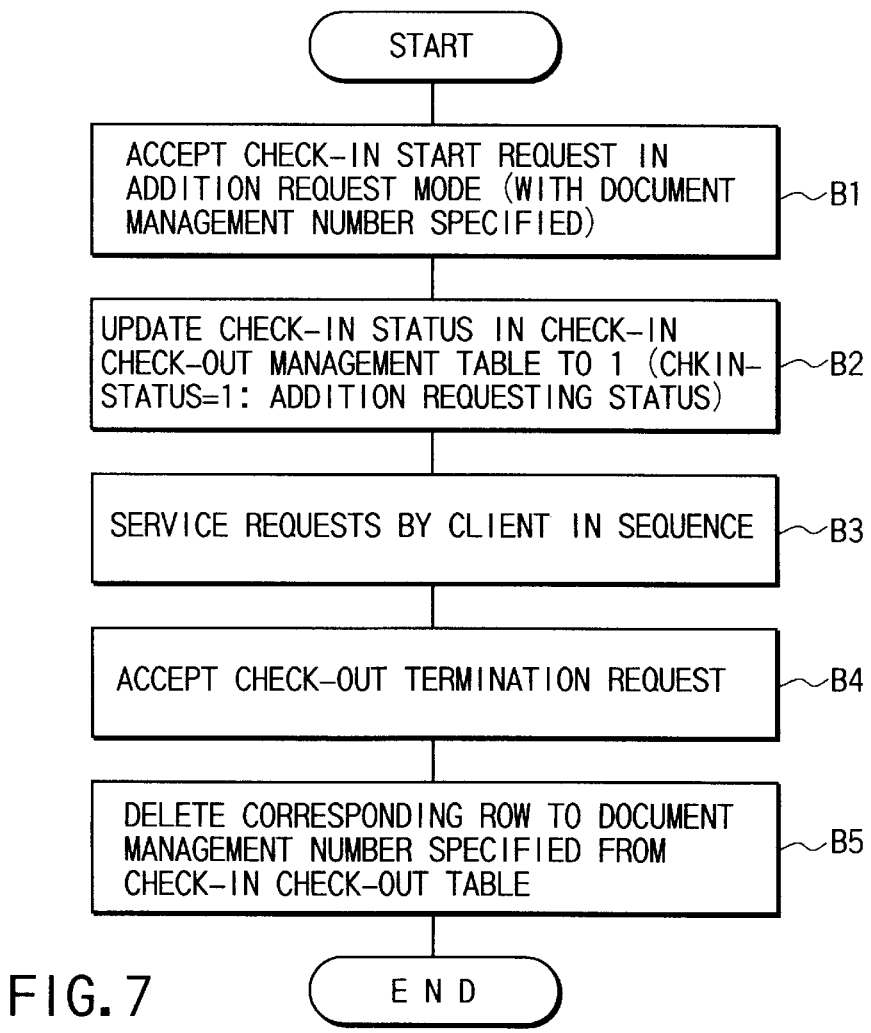
FIG. 7 is a flowchart illustrating a check-in request acceptance procedure in the addition request mode of the check-in check-out-based document management facility in the embodiment.

First, the request acceptance processing operation of the server when the client 40 makes a check-in request in the addition request mode will be described with reference to the flowchart of FIG. 7. In the addition request mode, the updates requested by the client 40 are reflected in the document.

Upon accepting the check-in request in the addition request mode from the client 40 (step B1 in FIG. 7), the server updates the check-in status in the check-in check-out table (TBL-A) 21 to "1" to indicate that requests are being made for additions (step B2) and services each of the requests by the client 40, such as page addition, insertion, deletion, revision, revised version deletion, title revision, etc., in sequence (step B3).

Upon accepting a check-out termination request from the client 40 (step B4), the server deletes the status recording entries in the record created on the check-in check-out table (TBL-A) 21 for the check-out document (step B5) and terminates the processing.

Next, reference will be made to the flowchart of FIG. 8 to describe the request acceptance processing operation of the server when the client 40 makes a check-in request in the document replacement mode. In this mode, the original document is entirely deleted and a new document is created automatically. The contents of updates requested by the client 40 are reflected in the new document.

Upon accepting a check-in request in the document replacement mode from the client 40 (step C1 in FIG. 8), the server 10 updates the check-in status in the check-in check-out table (TBL-A) 21 to "2" (the document is under replacement)(step C2), deletes all the pages of the document (step C3), and services requests by the client 40 for page addition/insertion/revision, title revision, and so on in sequence (step C4).

Upon accepting a check-out termination request by the client (step C5), the server deletes the status recording entries in the record associated with the check-out document in the check-in check-out table (TBL-A) 21 (step C6) and then terminates the processing.

Next, reference will be made to the flowchart of FIG. 9 to describe the request acceptance processing operation of the server when the client 40 makes a check-in request in the document revision mode. In this mode, the original document is left as the old version and a new document is created automatically. The contents of updates requested by the client 40 are reflected in the new document.

Upon accepting a check-in request in the document revision mode from the client 40 (step D1 in FIG. 9), the server 10 updates the check-in status in the check-in check-out table (TBL-A) 21 to "3" (the document is under revision) (step C2), enters a new document and associates with the original document by the document link table (TBL-B) 22 (step D3), and services requests by the client 40 for page addition/insertion/revision, title revision, and so on in sequence (step D4).

Upon accepting a check-out termination request by the client (step D5), the server deletes the status recording entries in the record associated with the check-out document in the check-in check-out table (TBL-A) 21 (step D6) and then terminates the processing.

Next, reference will be made to the flowchart of FIG. 10 to describe the request acceptance processing operation of the server 10 at the time when the client 40 makes a check-out cancel request. The processing described here forms a part of check-out cancel processing (step F11) which will be described later in detail.

Upon accepting a check-out cancel request from the client 40 (step E1 in FIG. 10), the server deletes one row of status recording entries corresponding to the document management number specified at the time of request (step E2) and then terminates the processing.

In this manner, the check-in check-out-based document management is implemented using the check-in check-out table (TBL-A) 21.

Restrictions on operations by the client 40 during check-in/check-out (whether to permit operations during check-in/check-out or not) are illustrated in FIG. 11 in the form of comparison among the check-out user, the user having check-out cancel right, and other users. Here, permissible operations (processing that can be carried out as requested) are indicated with circles.

For a reference (retrieval, printing or the like) with no update to a document entered into the document storage unit 30 managed by the server 10, any user can read any document at any time with a document specifying operation on the client side as is the case with the conventional system.

When a request is made to update a document the time limit of which has expired during check-out, the server performs check-out cancel processing and then accepts the update request.

If, when the client 40 retrieves a document, it is being checked out, the status information on that document is displayed on the document list display screen, thereby allowing the user to recognize documents that are under check-out with ease.

As a modification of the embodiment, instead of setting the check-out cancel right on the user table (TBL-C) 23, a predetermined user in charge of system management may manage the check-out cancel right.

Next, reference will be made to FIGS. 12 to 18 to describe the operation of the check-in check-out-based document management system of the embodiment in more detail.

Figure 12:
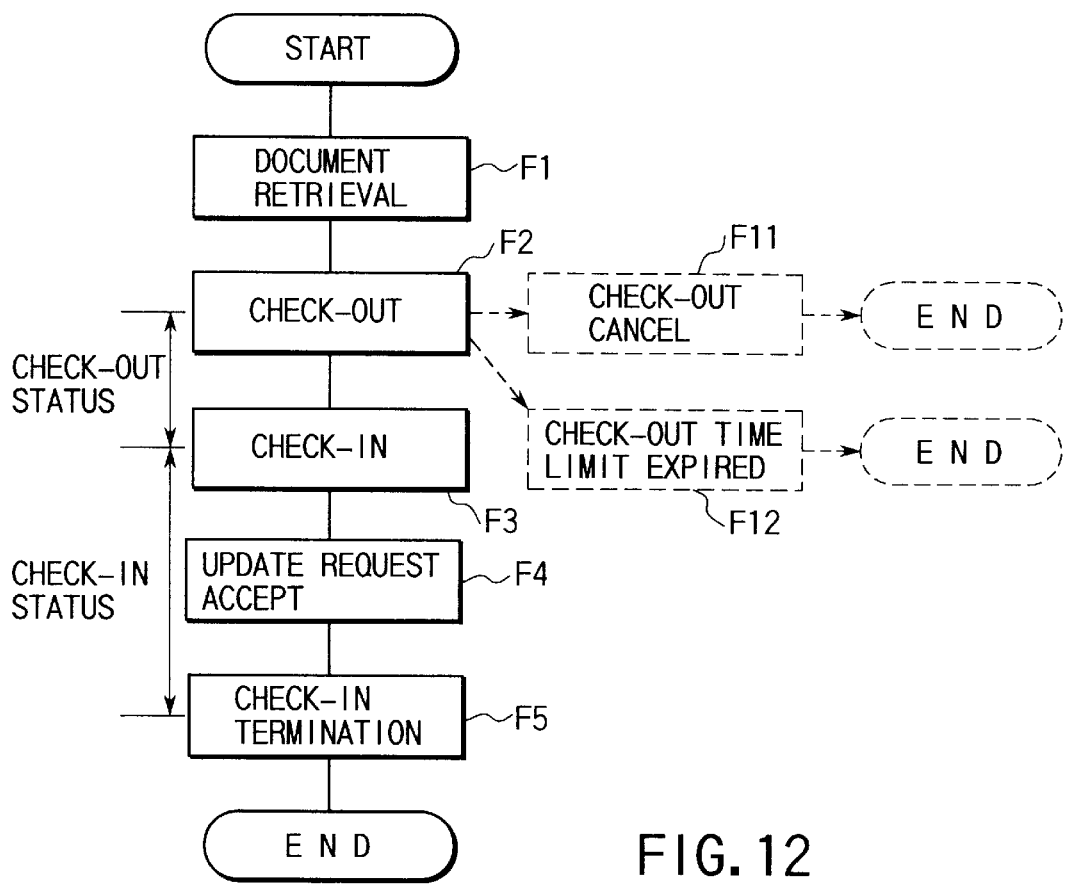
FIG. 12 is a flowchart illustrating the flow of the overall processing of the check-in check-out-based document management facility in the embodiment.

FIG. 12 is a flowchart illustrating the entire process flow.

First, retrieval of a document entered into the document storage unit 30 managed by the server 10 is performed by a user operation on the client side (step F1 in FIG. 12).

When the document is being checked out, information to the effect that it is being checked out is displayed on the document list display screen on the client 40. When the client issues a check-out request with a document management number specified, the server receives the check-out request and carries out document check-out processing in accordance with the contents of the request (step F2).

When receiving a check-out cancel request from the client, the server carries out check-out cancel processing as will be described later (step F11). When the time limit of the specified document is up, the server performs predetermined processing on the check-in check-out table (TBL-A) 21 as will be described later (step F12).

When the client issues a check-in request with a document management number specified after the check-out processing, the server receives the check-in request and carries out check-in processing with document updates in accordance with the contents of the request (steps F3 and F4). The server then receives a check-out termination request from the client to thereby terminate the check-in processing (step F5).

Figure 13:
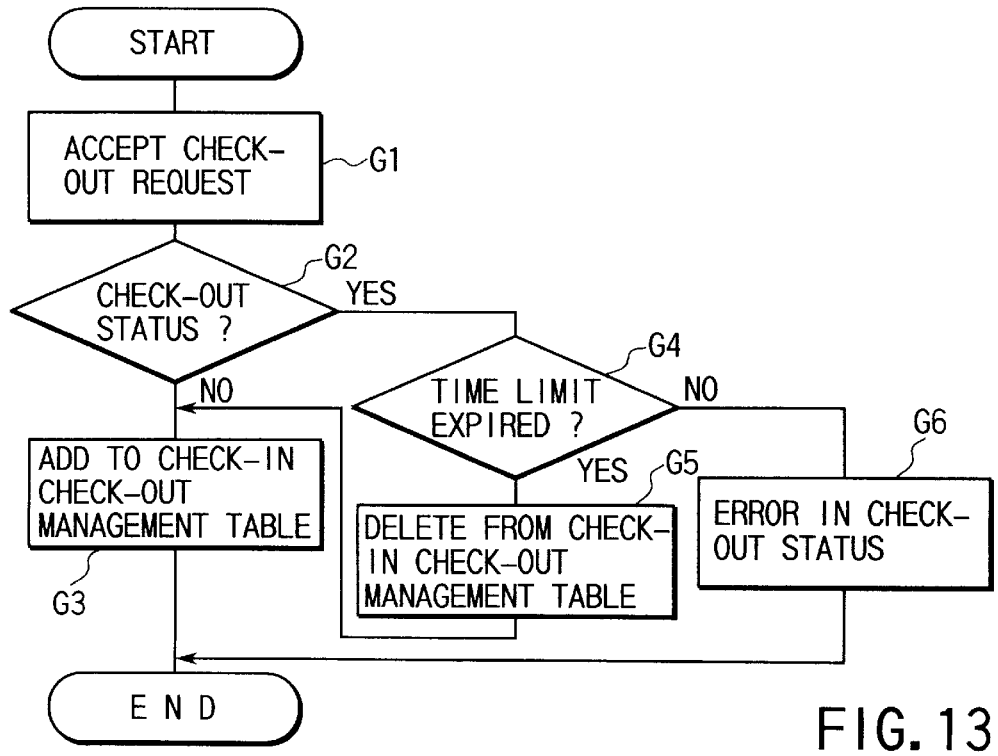
FIG. 13 is a flowchart for the check-out procedure in step F2 in FIG. 12.

The details of the check-out processing in step F2 shown in FIG. 12 will be described with reference to the flowchart shown in FIG. 13.

Upon receipt of a check-out request from the client 40 (step G1 in FIG. 13), the server 10 refers to the check-in check-out table (TBL-A) 21 to determine whether or not the document specified by the document management number in that request is being checked out (step G2).

If the specified document is not being checked out in other words, it has been checked in, one row of the document management number entry, the check-out user entry, the check-out date entry, the check-out time limit entry and the check-in status entry as shown in FIGS. 2 and 3 is created in the check-in check-out table (TBL-A) 21 as described in conjunction with FIG. 6. The contents specified at the time of the request are written into these entries (step G3).

At this point, any desired time limit of the check-out can be set by the user.

If, on the other hand, the specified document is being checked out, reference is made to the check-out time limit entry in the check-in check-out table 21 to determine whether or not that document is within the time limit (step G4). As described previously, the time limit is set to, for example, one month after check-out unless specified by the user.

When the time limit is expired, the status recording entries in the corresponding row are deleted from the check-in check-out table 21 (step G5) and one row of status recording entries is created anew to update the status recording entries for the specified document.

When the specified document is within the time limit, the check-out processing is stopped because the document is being checked out to another user. A message to the effect that the document is being checked out is sent to the client 40 to thereby prevent the concurrent double updating of the same document by two or more users (step G6).

Figure 14:
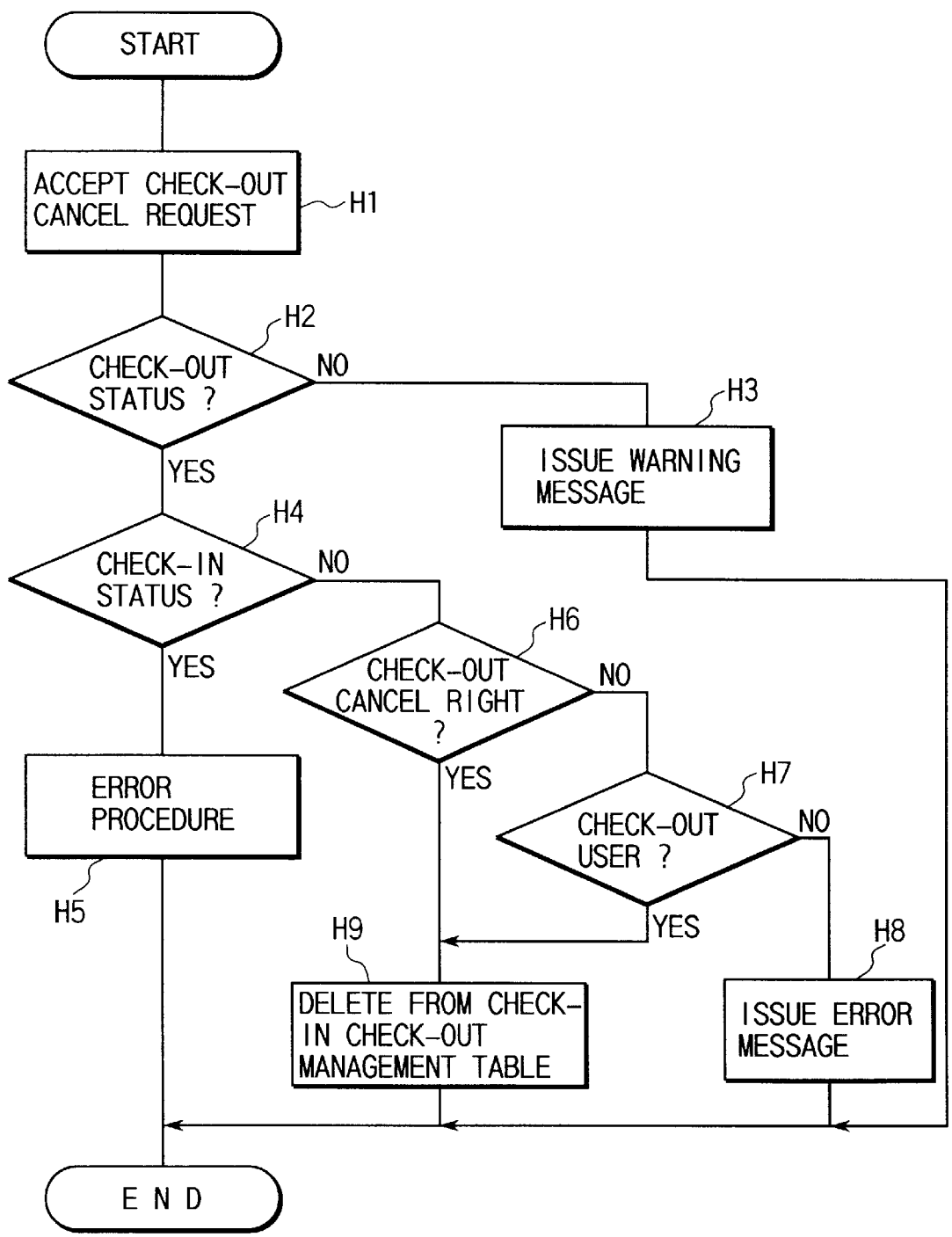
FIG. 14 is a flowchart for the check-out cancel procedure in step F11 in FIG. 12.

Next, reference will be made to the flowchart of FIG. 14 to describe the detail of the check-out cancel processing indicated in step F11 of FIG. 12.

The server receives a check-out cancel request from the client (step H1 of FIG. 14) and then determines whether or not the specified document for which the request has been made is being checked out (step H2).

If the specified document is not checked out, the check-out cannot be canceled. In this case, a warning message is sent to the check-out cancel requesting client (step H3) and the process comes to an end. If, on the other hand, the specified document is being checked out, it is determined whether or not the document is now checked in (step H4).

When the document is checked in, an error procedure is carried out to prevent check-out cancel (step H5) and the process is then terminated. If the document is not checked in, a reference is made to the user table (TBL-C) 23 to determine whether or not the check-out cancel requesting user has the check-out cancel right (step H6).

If the check-out cancel requesting user has the check-out cancel right, then the status recording entries in the corresponding row in the check-in check-out table 21 are deleted (step H9) and the process is then terminated. If, on the other hand, the user has not the check-out cancel right, a reference is made to the check-in check-out table 21 to determine whether or not the user is the check-out user who has checked out the document (step H7).

If the user is the check-out user, then the status recording entries in the corresponding row are deleted from the check-in check-out table 21 (step H9) and the process is then terminated. If, on the other hand, the user has not the check-out cancel right nor is it the check-out user, an error message describing that the check-out cannot be canceled is sent to the check-out cancel requesting client 40 (step H8) and the process is then terminated.

Figure 15:
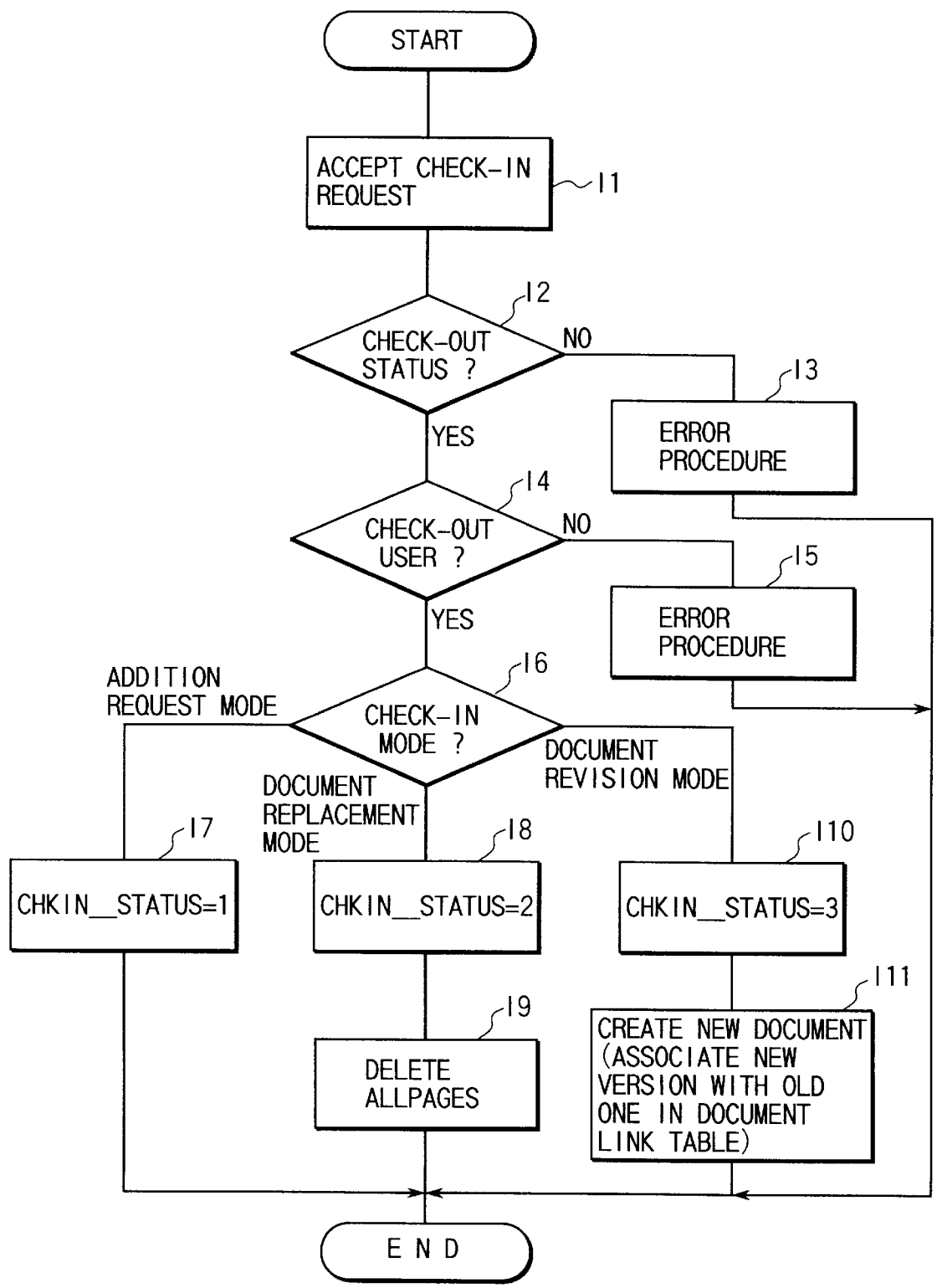
FIG. 15 is a flowchart for the check-in procedure in step F3 in FIG. 12.
Figure 16:
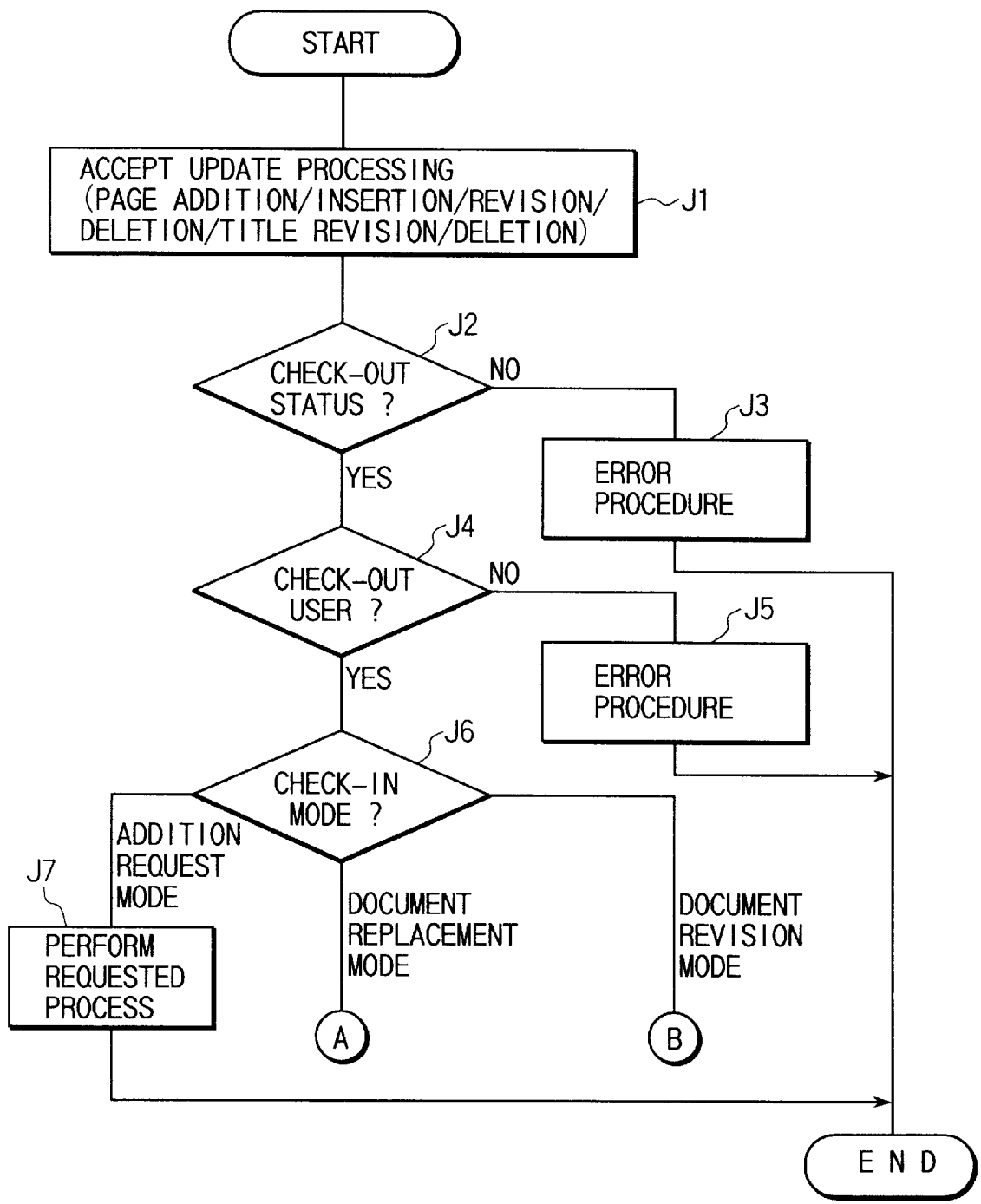
FIG. 16 is a flowchart for part of the update request acceptance procedure in step F4 in FIG. 12.

Next, reference will be made to the flowchart of FIG. 15 to describe the detail of the check-in processing indicated in step F3 of FIG. 12.

The server 10 receives a check-in request from the client 40 (step I1 in FIG. 15) and determines whether or not the specified document is now checked out (step I2).

When the document is not checked in, an error procedure is carried (step I3) and the process is then terminated. If, on the other hand, the document is checked out, then the server makes a reference to the status recording entries in the check-in check-out table 21 to determine whether or not the user is the check-out user (step I4).

If the requesting user is not the check-out user, then an error procedure is carried out (step I5) and the process is terminated. If, on the other hand, the user is the check-out user, then it is determined what the check-in mode is (step I6).

If the check-in mode is the addition request mode, then the check-in status in the check-in check-out table 21 is updated to "1" (addition is being requested) (step I7) and the process is terminated.

If, on the other hand, the check-in mode is the document replacement mode, then the check-in status in the check-in check-out table 21 is updated to "2" (document is being replaced) (step I8) and all the pages of the document are deleted (step I9). The process is then terminated.

If, on the other hand, the check-in mode is the document revision mode, the check-in status in the check-in check-out table (TBL-A) 21 is updated to "3" to indicate that the document is under revision (step I10). A new document is then entered and associated with the original document by the document link table (TBL-B) 22 (step I11). Then, the process comes to an end.

Next, the detail of the update request acceptance processing (step F4) shown in FIG. 12 will be described with reference to the flowcharts of FIGS. 17A and 17B.

Upon receipt of any request (page addition, page insertion, page deletion, page revision, revised version deletion, title revision, or the like) from the client 40 (step J1), the server 10 determines whether or not the specified document is being checked in (step J2).

When the document is not checked in, an error procedure is carried out (step J3) and then the processing comes to an end. When the document is checked in, a reference is made to the status recording entries in the check-in check-out table 21 to determine whether or not the user is the check-in user who has checked in the document (step J4).

If the user is not the check-in user, an error procedure is carried out (step J5) and the processing then comes to an end. If, on the other hand, the user is the check-in user, then it is determined what the check-in mode is (step J6).

If the check-in mode is the addition request mode, the requested process is carried out (step J7) and the process then comes to an end.

If, on the other hand, the check-in mode is the document replacement mode, then it is determined whether or not the request by the client 40 is compatible with that mode (step J8). If it is not, an error procedure is carried out (step J9) and the process then comes to an end. If it is, the requested processing (page addition, insertion, title revision or the like) is carried out (step J10) and the process then comes to an end.

If the check-in mode is the document revision mode, then it is determined whether or not the request by the client 40 is compatible with that mode (step J11). If it is not, the error procedure is carried out (step J12) and the process comes to an end. If it is, the requested processing (page addition, insertion, title revision or the like) is carried out (step J13) and the processing comes to an end.

Next, the detail of the check-in termination processing (step F5) will be described with reference to the flowchart of FIG. 18.

The server 10 receives a check-in termination (check-out termination) request from the client 40 (step K1).

Upon receipt of this request, the server deletes one row of status recording entries associated with the check-out document created in the check-in check-out table 21 (step K2), thus completing the check-in termination processing.

The provision of the check-in check-out-based document management facility as described so far permits the following document management function to be implemented.

That is, the concurrent multiple updating of the same document by two or more clients can be prevented by allowing the server, which directs the check-in check-out management of a document that two or more clients share, to have a function of prohibiting the check-out of that document until the document is checked in, or the check-out of the document is canceled.

In addition, two or more clients can update the same document individually by allowing the server to have a function of implementing the check-out of a document as requested by a client after that document has been checked in or the check-out thereof has been canceled. Also, the check-out function can indicate the termination of updating by a certain client, permitting subsequent updating by another client to be performed correctly.

Further, the server can have a function of performing updating processes requested at the time of check-in in sequence, allowing check-in requests in various modes to be serviced.

Moreover, the server can have a function of deleting, at the time of check-in of a document, the original document in its entirety, automatically creating a new document, and performing requested updating processes on the new document in sequence, allowing the check-in request in the document replacement mode to be serviced.

Furthermore, the server can have a function of, after a document has been checked out, canceling the check-out without updating, allowing the check-out to be canceled with ease without updating the check-out itself.

In addition, the server can have a function of setting a time limit of the check-out, monitoring it, and automatically canceling the check-out when the time limit of the check-out document has expired, thus avoiding a situation in which a certain client continues the check-out of a document and another client is kept unable to update the document over a long period.

Also, the server can have a function of enabling a specific client 40 to cancel the check-out. That is, by allowing a specific client 40 to have permission to cancel the check-out even if it is not the check-out client, a situation in which a certain client continues the check-out of a document and another client is kept unable to update the document over a long period can be avoided under the management of the specific client 40.

Further, the server can have a function of notifying clients 40 that a document is being checked out, allowing clients other than the check-out user to recognize that the document is being checked out at the stage of displaying a list of documents.

As described in detail, according to the present invention, the server, which directs the check-in check-out management of a document that two or more clients share, is arranged to have a function of prohibiting the check-out of that document until the document is checked in, or the check-out of the document is canceled.

By such an arrangement, there are provided a client-server electronic filing system which permits the contents of changes made by each client to a document to be reflected correctly in the original document with the consistency of the document contents maintained and a document management method and a storage medium for use in the electronic filing system.

In addition, there are provided a client-server electronic filing system which prevents the concurrent multiple updating of the same document by two or more clients and a document management method and a storage medium for use in the electronic filing system.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document management method for use in an electronic filing system having means for storing documents, a plurality of client units, each capable of issuing a check-out request to read out a document from said storing means so as to change the document and issuing a check-in request to write a document, which has been checked out and changed, to said storing means, and means for inhibiting a document, which has been checked out by a first client unit, from being checked out by a second client unit, comprising the steps of:

issuing, from said first client unit, a first check-out request for a document to read out the document from said storing means so as to change the document;

setting a time limit of check-out for a document which has been stored in said storing means, when the document is read out from said storing means in accordance with said first check-out request;

issuing, from a second client unit, a second check-out request for the document which has been checked out by said first client unit;

checking, in response to said second check-out request, the time limit which has been set for the document and in a case where the time limit has not expired, inhibiting the document from being checked out by said second client unit; and checking, in response to said second check-out request, the time limit which has been set for the document and in a case where the time limit has expired, canceling the check-out of the checked out by said second client unit.

2. A document management method for use in an electronic filing system having means for storing documents, a plurality of client units, each capable of issuing a check-out request to read out a document from said storing means so as to change the document and issuing a check-in request to write a document, which has been checked out and changed, to said storing means, and means for inhibiting a document, which has been checked out by a first client unit, from being checked out by a second client unit, comprising the steps of:

issuing, from said first client unit, a first check-out request for a document to read out the document from said storing means so as to change the document;

providing a specific client unit with an authority of canceling check-out of a document which has been checked out by another client unit; and canceling the check-out of the document which has been checked out by said another client unit, in accordance with an instruction from said specific client unit.

* * * * *

UNITED STATES PATENT AND TRADEMARK OFFICE
CERTIFICATE OF CORRECTION

| | |
|---|---|
| PATENT NO. | : 6,185,563 B1 |
| DATED | : February 6, 2001 |
| INVENTOR(S) | : Yosuke Hino |

It is certified that error appears in the above-identified patent and that said Letters Patent is hereby corrected as shown below:

<u>Column 13,</u>
Line 2, after "check-out of the", insert -- document which has been checked out by said first client unit and allowing the document to be --.

Signed and Sealed this

Seventeenth Day of December, 2002

JAMES E. ROGAN
*Director of the United States Patent and Trademark Office*